United States Patent [19]

Hoshikawa et al.

[11] Patent Number: 4,526,818
[45] Date of Patent: Jul. 2, 1985

[54] LIQUID CRYSTAL DISPLAY PANEL AND PROCESS FOR THE PRODUCTION THEREOF

[75] Inventors: Jun Hoshikawa; Yukihiro Iwashita; Osamu Suzuawa, all of Shiojiri, Japan

[73] Assignee: Epson Corporation, Tokyo, Japan

[21] Appl. No.: 564,457

[22] Filed: Dec. 22, 1983

[30] Foreign Application Priority Data

Dec. 23, 1982 [JP] Japan .................. 57-228182
Apr. 14, 1983 [JP] Japan .................. 58-65961
Apr. 14, 1983 [JP] Japan .................. 58-65965
Apr. 14, 1983 [JP] Japan .................. 58-65969
Apr. 14, 1983 [JP] Japan .................. 58-65970

[51] Int. Cl.³ ............................................ C09K 3/34
[52] U.S. Cl. .............................. 428/1; 156/99; 156/106; 156/221; 156/291; 428/212
[58] Field of Search .............. 428/1, 212; 156/99, 156/106, 221, 285, 291

[56] References Cited

U.S. PATENT DOCUMENTS

4,088,991  5/1978  Sachar .................. 340/783
4,292,370  9/1981  Pekko .................... 428/1
4,425,030  1/1984  Schmidt .................. 428/1
4,427,741  1/1984  Aizawa ................... 428/1

Primary Examiner—Marion E. McCamish
Attorney, Agent, or Firm—Blum Kaplan Friedman Silberman & Beran

[57] ABSTRACT

A liquid crystal display panel having uniform cell thickness is composed of a first substrate and a second opposed substrate where each substrate has cooperating electrodes selectively disposed on the interior surfaces thereof. At least one of the substrates is a laminate of two flexible plastic films and a polarizing film therebetween. The plastic films have different thermal expansion coefficients, with the thermal expansion coefficient of the film on the interior surface being less than the thermal expansion coefficient of the film on the opposed substrate so that the center of the substrate is biased convexly towards the opposed substrate. Substantially rigid spacer members are disposed between the substrates. Adhesive substances are disposed about the periphery of the substrates for coupling the substrates and maintaining the display panel assembled. The at least one substrate is a laminate biased against the spacer members for maintaining uniform thickness across the display panel.

24 Claims, 11 Drawing Figures

LIQUID CRYSTAL DISPLAY PANEL AND PROCESS FOR THE PRODUCTION THEREOF

BACKGROUND OF THE INVENTION

The present invention is generally directed to liquid crystal display panels and, in particular, to a liquid crystal display panel employing flexible substrates and processes for their production.

It has been proposed to use flexible materials, such as plastic films as substrates for liquid crystal display panels. However, it has been extremely difficult to construct a liquid crystal display panel using flexible substrates having a uniform cell thickness over the entire surface of the display panel. Accordingly, it is desirable to provide a liquid crystal display panel using flexible materials as a base, and having uniform cell thickness.

SUMMARY OF THE INVENTION

Generally speaking, in accordance with the invention a liquid crystal display panel formed with at least one substrate having uniform thickness and a process for the production thereof is provided. The liquid crystal display panel includes at least a first substrate including a polarizing film sandwiched between and having a convex surface generated as a result of the difference in thermal expansion coefficient between the two outer films forming the substrate, the convex surface facing the liquid crystal material and the second substrate of the display cell.

In the process for preparing the liquid crystal display panels in accordance with the invention, the flexible substrates are formed from two flexible plastic films laminated about a polarizing film. A curvature is imparted to at least one substrate. A sealing agent is printed on at least one substrate and a gap agent is deposited on the convex surface of one substrate. The substrates are assembled with their convex surfaces facing each other. A liquid crystal is then injected into the assembled cell.

Accordingly, it is an object of the instant invention to provide an improved liquid crystal display panel.

Another object of the instant invention is to provide an improved process for the production of a liquid crystal display panel having a uniform thickness.

Yet another object of the instant invention is to provide a liquid crystal display panel with a uniform cell thickness.

Still another object of the instant invention is to provide a liquid crystal display panel formed with at least one substrate of a flexible material.

Yet another object of the instant invention is to provide a liquid crystal display panel with at least one plastic film as a substrate.

Still other objects and advantages of the invention will in part be obvious and will in part be apparent from the specification.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Four types of liquid crystal display panels (Types A–D) in accordance with the present invention and a process for production will be described.

A Type A liquid crystal display panel in accordance with the invention includes a liquid crystal layer with spacers disposed between a pair of plastic substrates. Each substrate is formed from at least a polarizing film sandwiched between and integrated with plastic films having different thermal expansion coefficients. The thermal expansion coefficients of the plastic film on the liquid crystal layer side of each base are lower than the thermal expansion coefficients of the plastic film on the other side of the polarizing film to impart a curvature to each substrate.

A Type B liquid crystal display panel in accordance with the invention includes a liquid crystal layer with spacers disposed between a pair of opposed substrates formed from two plastic films having different thermal expansion coefficients. The thermal expansion coefficient of the plastic film on the liquid crystal layer side is lower than that on the other side of the polarizing film to impart a curvature to the substrate. One substrate includes a polarizing film sandwiched between and integrated with the two plastic films. The other substrate includes a polarizing film, a reflecting layer laminated beneath the polarizing film between the pair of plastic films to seal the polarizing film and reflecting layer within two plastic films.

A Type C liquid crystal display panel includes a liquid crystal layer with spacers disposed between a pair of plastic substrates. One of the plastic substrates includes a polarizing film sandwiched between and integrated with two plastic films having different thermal expansion coefficients. The thermal expansion coefficient of the plastic film on the liquid crystal layer side of the polarizing film is smaller than the thermal expansion coefficient of the film on the opposite side of the polarizing film to impart a curvature to the substrate. The other substrate has a thermal expansion coefficient less than or equal to the thermal expansion coefficient of the plastic film in the first plastic substrate having the smaller thermal expansion coefficient.

A Type D liquid crystal display panel includes a liquid crystal layer with spacers disposed between two opposed plastic substrates. One of the substrates includes a polarizing film sandwiched between and integrated with two plastic films having different thermal expansion coefficients. The thermal expansion coefficient of the plastic film on the liquid crystal layer side is less than the thermal expansion coefficient of the film on the opposite side to impart a curvature to the substrate. The other plastic substrate is formed of a polarizing film sandwiched between and integrated with two plastic films having substantially the same thermal expansion coefficient.

The liquid crystal display panels constructed in accordance with the invention are suitable for use with a wide variety of liquid crystal materials. They may be used with a twisted nematic type liquid crystal, a dynamic scattering mode type and those operating in the smetic phase, the phase inversion type, the guest-host type and the like.

Figure 1:
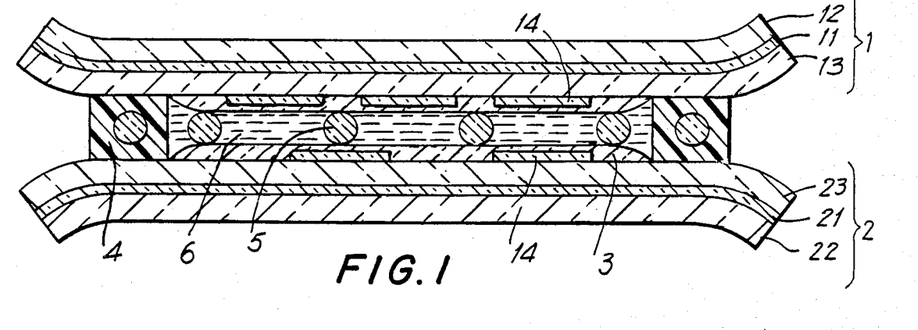
FIG. 1 is a cross-sectional view of a liquid crystal display panel constructed in accordance with a first embodiment of the invention.

Reference is made to FIG. 1 wherein a Type A liquid crystal display panel in accordance with a first embodiment, constructed in accordance with the invention is depicted. The liquid crystal display panel includes an upper electrode substrate 1 and a lower electrode substrate 2 with a liquid crystal layer 6 and spacers 5 disposed in the space between the substrates. Spacers 5 are, for example, glass fiber, glass beads, or plastic beads.

Upper substrate 1 is formed from polarizing film 11 sandwiched between and integrated with an upper film 12, and a lower plastic film 13. Similarly, substrate 2 includes a polarizing film 21 laminated between an upper plastic film 23 and a lower plastic film 22. Transparent electrodes 14, made of $SnO_2$, $In_2O_3$, or ITO, for example, are disposed on the interior surfaces of electrode substrates 1 and 2. The space between substrates 1 and 2 is sealed about its periphery by a sealing agent 4 and liquid crystal layer 6 is injected. Sealing agent 4 is, for example, a silicone resin, an epoxy resin, a urethane resin or an acrylic resin. An orientation layer 3 of e.g. a polyimide resin, a polyamide resin, a polyamideimide resin is coated on transparent electrodes 14 in desired patterns. Orientation treatment of layers 3 may be done by rubbing or oblique deposition.

Figure 2:
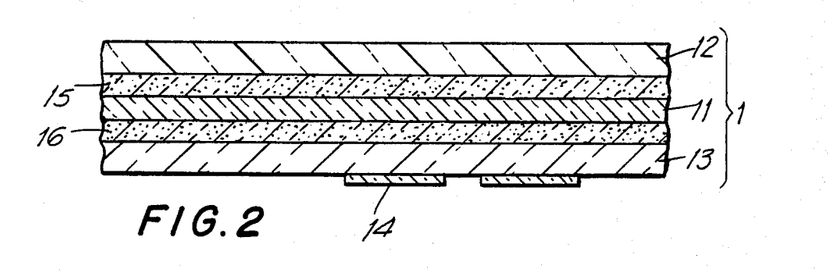
FIG. 2 is an enlarged cross-sectional view of a part of the display panel in FIG. 1.

FIG. 2 shows the embodiment wherein upper substrate 1 includes polarizing film 11 laminated with plastic films 12 and 13. Upper substrate 1 is constructed by laminating and integrating polarizing film 11 between plastic films 12 and 13 using an adhesive layer 15 and 16 on both surfaces of polarizing film 11. Adhesive 15 may be a silicone resin, an epoxy resin, an acrylic or a urethane resin sufficiently transparent so as not to influence the appearance adversely. Transparent conductive film 14 having a predetermined pattern is placed on lower plastic film 13 of upper substrate 1. Plastic films 12 and 13 have different thermal expansion coefficients. The thermal expansion coefficient of plastic film 13 on the liquid crystal layer side of substrate 1 is lower than that of plastic film 12 on the outer side of substrate 1. Plastic films 12 and 13 and polarizing film 11 can be integrated by applying a strain at a high temperature. The temperature should be higher than the highest operating temperature of the liquid crystal display panel. The thermal expansion coefficient may also be called a distortion rate and relates the distortion of the plastic to a change in temperature.

Examples of polarizing film 11 include stretched polyvinyl alcohol (PVA) film dyed with iodine or an iodine compound, stretched PVA film dyed with a dichromatic dye, stretched and orientated PVA upon which a dehydration reaction using an acid catalyst to form a polyvinylene structure has been performed, a polyvinylchloride (PVC) film treated with a basic compound to dehydrochlorinate and then converting it into a PVC film having a polyvinylidene structure in the backbone which is stretched to orientate the molecules. The thickness of polarizing film 11 is preferably between about 1 through 70μ.

Examples of the materials which may be used in plastic films 12 and 13 for sandwiching polarizing film 11, include polyester resins, cellulosic resins, polyethersulfone resins, polysulfone resins, polycarbonate resins, acrylic resins and laminated resins thereof. The thickness of films 12 and 13 is between about 20μ and 1 mm. The total thickness of the display assembly is between about 50μ and 1.5 mm, preferably between about 50μ and 1 mm and more preferably between about 50μ and 0.5 mm.

The combinations of films 12 and 13 which will satisfy the required relationship, that one has a higher thermal expansion coefficient than the other, include for example, acryl-cellulose, acryl-polysulfone, acryl-polyethersulfone, acryl-polyester acryl-phenoxy, phenoxy-cellulose, phenoxy-polyethersulfone, phenoxy-acryl and phenoxy-polyester. Among these, the thermal expansion coefficient of the acryl varies depending on its type. Thus, either acryl-phenoxy or phenoxy-acryl can provide the desired result depending on the type of acryl selected.

Similarly, as in the case of substrate 1, the selection of plastic films 22 and 23 of base 2 with polarizing film 21 therebetween is such that film 22 has a higher thermal expansion coefficient than film 23.

Substrates 1 and 2 may be prepared by a variety of film laminating procedures, such as for example, the laminating method employed in food packaging.

The plastic films used must be sufficiently transparent so as not to influence the display adversely. It is also desired that they have no optical rotation. However, when the plastic film does impart optical rotation, such as a polyester film produced by axial or monoaxial orientation, it is necessary to integrate polarizing element 11 and plastic films 12 and 13 so that the polarizing axis of polarizing film 11 and the orientation direction of the biaxial or monoaxial orientation are in parallel or are at right angles. Further, a plastic film with optical rotation should not be placed on the liquid crystal layer side of polarizing film 11.

Substrates 1 and 2 are laminated at high temperature. More specifically, they are coupled at a temperature higher than the upper limit of the operating temperature for the liquid crystal display panel (generally 40° C. or higher). Plastic film 13 on the liquid crystal layer side is laminated to plastic film 12 on the opposite side of polarizing film 11 so that film 13 has a higher thermal expansion coefficient than film 12. Films 11, 12 and 13 are laminated either in a flat shape, or by applying a strain to give a somewhat concave shape outward from the liquid crystal layer side or by applying a predetermined strain which makes a substrate curve outward from the liquid crystal layer side at normal temperatures or in the range of working temperature. The adhesive generally reacts and adheres at the high temperatures employed.

When the liquid crystal display element is assembled, as in FIG. 1, upper substrate 1 has polarizer 11 laminated between plastic films 12 and 13 and lower substrate 2 has polarizing film 21 laminated between film 22 and 23. Substrates 1 and 2 have been arranged so that the expansion coefficient of plastic films 13 and 23 on the liquid crystal layer side of substrates 1 and 2 is less than the thermal expansion coefficient of plastic films 12 and 22 on the opposite sides. Electrode substrates 1 and 2 tend to curve outward and push against spacers 5. Since spacers 5 are rigid, both electrode substrates 1 and 2 cannot compress the cell to less than the thickness of spacers 5. This provides a uniform cell thickness over the entire surface area of thecell. By placing spacers 5 within the space defined by sealing agent 4, a more uniform cell thickness is achieved.

By constructing substrates 1 and 2 using the same materials for outer plastic films 12 and 22 and another material for plastic films 13 and 23, the aforementioned curving affect is more clearly manifested because the curving forces of bases 1 and 2 against each other are balanced. The liquid crystal display assembly in this manner may be either a transmissive type or a reflecting type.

Figure 3:
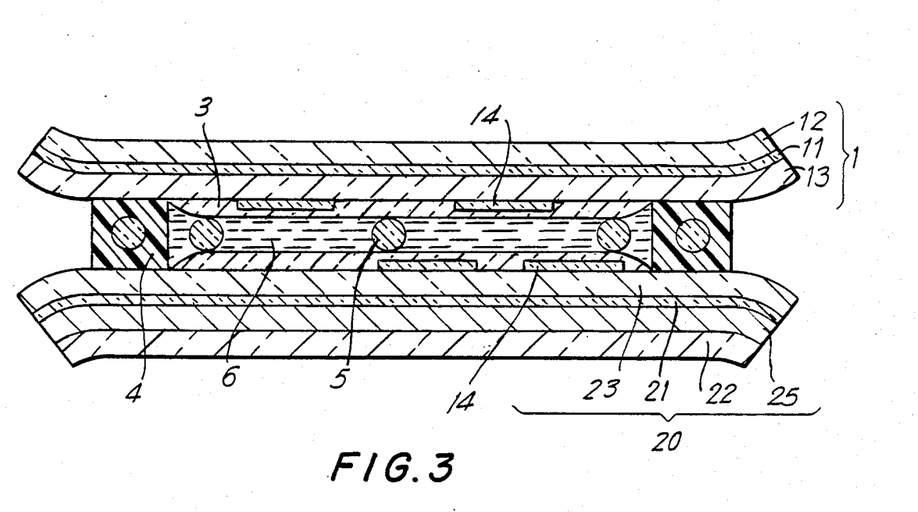
FIG. 3 is a cross-sectional view of a liquid crystal display panel constructed in accordance with a second embodiment of the invention.

Reference is next made to FIG. 3 wherein a Type B liquid crystal display assembly constructed in accordance with a second embodiment is depicted. This liquid crystal display panel is of the reflecting type and a reflecting layer 25 is laminated in a lower electrode substrate 20. Reflecting layer 25 is formed by incorporating leads, beads, particles, powder or foil or aluminum, either by kneading into an adhesive, such as an epoxy resin, an acrylic resin, a silicone resin or a urethane resin or by deposition, spattering, electroplating or spraying. The thickness of reflecting layer 25 is between about 1-100μ. When reflecting layer 25 is formed by kneading the reflecting beads or reflecting powder with the adhesive layer, one or both adhesive layers 15 and 16 applied to both sides of reflecting layer 25 may be omitted.

Figure 4A:
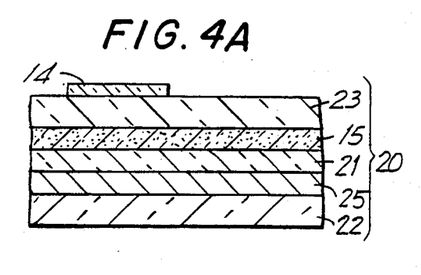
FIG. 4a, FIG. 4b and FIG. 4c are partial cross-sectional views of lower electrode substrates for liquid crystal display panels in accordance with the invention.
Figure 4B:
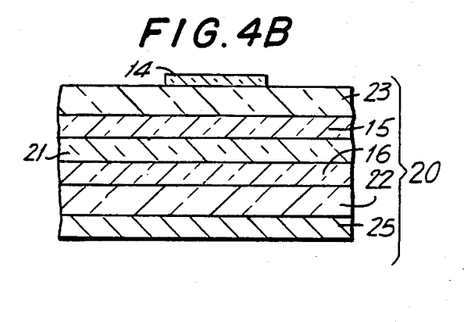
Figure 4C:
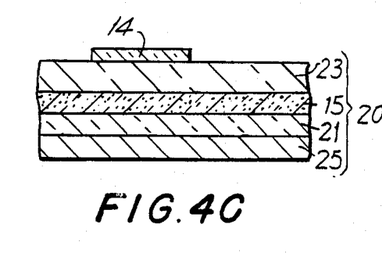

Reference is next made to FIGS. 4a, 4b and 4c wherein three embodiments of lower electrode substrate 20 are shown. Reflecting layer 25 is placed beneath polarizing layer 21 and above lower plastic film 22 in FIG. 4. Reflecting layer 25 is formed underneath plastic film 22 in FIG. 4b. Reflecting layer 25 is placed directly underneath polarizing film 21 without a lower plastic film 22 in FIG. 4c. In all cases, lower substrate 20 is constructed so that the thermal expansion coefficient of plastic film 23 on the liquid crystal layer side of polarizing film 21 is less than the thermal expansion coefficient of the material on the opposite side of polarizing film 21. As in the case of upper substrate 1, lower substrate 20 is formed at high temperature, either in a flat shape, or by applying a strain to give the substrate a concave shape outward from liquid crystal layer 6. The total thickness of substrate 20 is similar to that of upper electrode base 1 described above, or between 20μ and 1 mm.

Whether the substrates curve is due to the thermal expansion coefficients of the materials used and whether a curving phenomenon exists in the range of working temperatures for the liquid crystal display panel generally in the range of 0°-40° C. for the materials used in the bases.

There are several ways to construct a liquid crystal display panel using substrates formed by laminating materials having different expansion coefficients in addition to the methods described above. For example, an adhesive can be applied at normal temperature. Subsequently, a strain is applied to one of substrates 1 or 2 at an elevated temperature so that when substrate 1 or 2 is cooled to a lower, operating temperature, it curves in a convex shape toward the liquid crystal layer side. Another method of constructing the cell is to take a material having a low expansion coefficient and integrating thereon a material having a higher expansion coefficient while applying a strain to the substrate at a higher temperature so that when the substrate is cooled to a lower, operating temperature, it curves in a convex shape toward the liquid crystal layer side.

When electrode substrates 1 and 2 are constructed in such a manner, upper electrode substrate 1, which has been laminated by applying a strain at high temperature tends to curve in a convex shape toward the liquid crystal layer side. This curvature is due to the expansion coefficient of plastic film 12 on the upper side of polarizing film 11 which is greater than the expansion coefficient of plastic film 13 on the lower side. On the other hand, lower electrode substrate 2, which has also been laminated by applying a strain at high temperature, tends to curve with the convex side towards liquid crystal layer side in the direction facing upper substrate 1. This curvature is due to the thermal expansion coefficient of film 23 above polarizing film 21 on the liquid crystal layer side being less than the thermal expansion coefficient of film 22 on the opposite side. However, because spacers 5 are disposed within liquid crystal layer 6, upper and lower electrode substrates 1 and 2 cannot curve beyond the limit set by the thickness of spacers 5. Thus, a liquid crystal display panel having a uniform cell thickness is formed.

When a metal thin plate is used as reflecting layer 25, the metal thin plate can be, for example stainless steel, silver or aluminum. Reflecting layer 25 has a thickness of approximately 1-500μ, preferably 1-200μ, more preferably 5-100μ, and most preferably 10-50μ. Also, a silver or aluminum foil may be used with the surface facing liquid crystal layer 6 reflection treated by calendering, depositing or spattering a metal on the metal thin plate or by coating or printing a paint thereon.

In lower electrode substrate 20, laminated plastic film 23 has a lower thermal expansion coefficient than does plastic film 22 and they are laminated by applying a strain at a high temperature. When the liquid crystal display panel has been constructed in this manner, upper electrode substrate 1 is formed so that plastic films 12 and 13 sandwich polarizing film 11. The thermal expansion coefficient of film 13, nearest liquid crystal layer 6 is less than the expansion coefficient of film 12 on the opposite side. As a result laminated upper electrode substrate 1 tends to curve outward and lower electrode substrate 2 also tends to curve in a concave shape outward from liquid crystal layer 6 in the direction opposite to upper electrode substrate 1 for the same reason. The presence of spacers 5 placed within liquid crystal layer 6 prevent electrode substrates 1 and 20 from compressing to less than the thickness of the spacer. This creates a uniform cell thickness over the entire surface area of the display panel.

Figure 6:
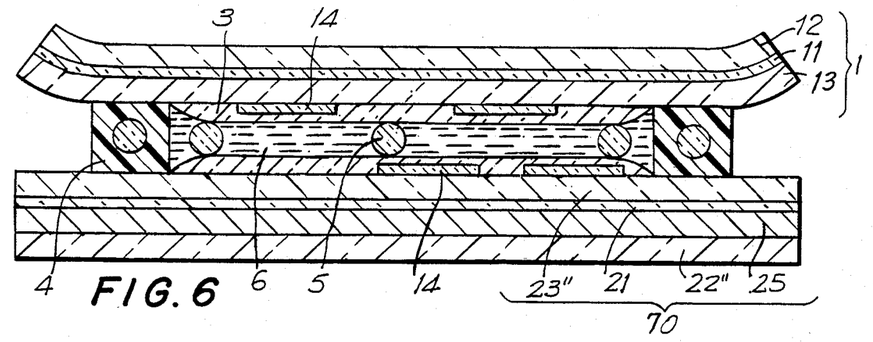
FIG. 6 is a cross-sectional view of a liquid crystal display panel constructed in accordance with another embodiment of the invention.

Reference is next made to FIG. 6, wherein a Type C, liquid crystal display panel in accordance with a third embodiment of the invention is depicted. Upper electrode substrate 1 is the same as upper electrode substrate 1 in the embodiment of FIG. 1. A lower electrode substrate 2 is made of two layers 23′ and 22′ of a material having a thermal expansion coefficient less than or equal to that of plastic film 12 in upper base 1, the inner plastic film with the smaller thermal expansion coefficient.

There are three ways to construct lower substrate 60. The first is constructed using the same plastic film as plastic film 12 on the liquid crystal layer side of upper electrode substrate 1. In this case, films 12, 22′ and 23′ are all formed of the same material.

In the second construction a material hving a lower thermal expansion coefficient than plastic film 12 is used. For example, lower electrode substrate 60 is constructed from a glass plate. Further, when plastic films 12 and 13 of upper electrode substrate 1 are a resin such as cellulose, polysulfone, polyethersulfone, acryl or phenoxy, plastic films 22′ and 23′ of lower electrode substrate 60 may be formed using a polyester resin having a lower thermal expansion coefficient than the above mentioned resins. When lower electrode substrate 60 is formed from a glass plate, it is of course possible to construct the lower electrode substrate 60 using a glass plate having transparent electrode 14 on the liquid crystal layer 6 side.

The third type of construction includes plastic films 22′ and 23′ having different thermal expansion coefficients, but both coefficients are lower than the thermal expansion coefficient of plastic film 12 of upper substrate 1.

When the liquid crystal display cell is constructed with upper substrate 1 formed of plastic films 12 and 13 sandwiching polarizing film 11 therebetween with the thermal expansion coefficient of film 13 facing the liquid crystal layer 6 side less than the thermal expansion coefficient of film 12, upper electrode substrate 1 tends to curve outwardly in a concave shape. Lower electrode substrate 60 does not deform and pressure is applied to substrate 1 by spacers 5. Since spacers 5 are rigid, the space between electrode substrates 1 and 2 cannot be less than the thickness of spacers 5. This creates a cell having an entirely uniform cell thickness.

Reference is next made to FIG. 6, wherein a liquid crystal display panel in accordance with a further embodiment of the invention is depicted. Lower electrode substrate 70 is similar to lower electrode substrate 20 in the embodiment of FIGS. 3 and 4. Plastic films 22″ and 23″ are chosen so that their thermal expansion coefficients are both less than the thermal expansion coefficient of plastic film 12. Upper electrode substrate 1 is constructed in the same manner as upper electrode substrate 1 in FIGS. 1 and 2. A glass plate having a low thermal expansion coefficient may be used as substrate 70. Lower electrode substrate 20 includes reflecting layer 25 made of a rigid metal plate or a thick metal plate which is not deformed when plastic films 22 and 23 are laminated.

Figure 5:
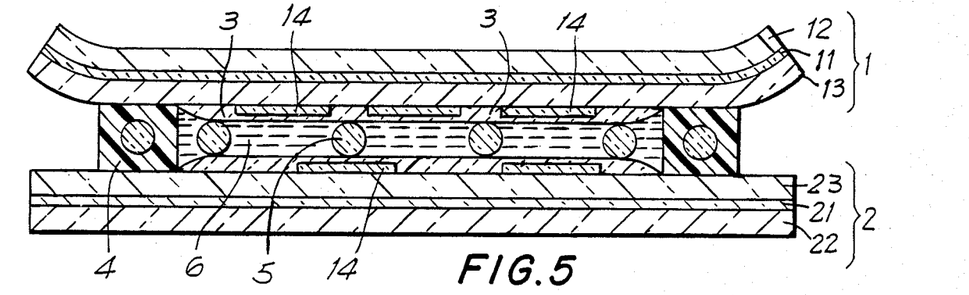
FIG. 5 is a cross-sectional view of a liquid crystal display panel constructed in accordance with a further embodiment of the invention.

As in the embodiment of FIG. 5, upper electrode substrate 1 tends to curve outwardly in a concave shape, whereas lower electrode substrate 70 does not deform causing upper electrode substrate 1 to push against spacers 5. Since spacers 5 are rigid, the space between electrode substrates 1 and 70 is not reduced to less than the thickness of spacers 5. This creates a liquid crystal display cell of entirely uniform thickness.

The liquid crystal display panel constructed in accordance with this embodiment is similar to the embodiment of FIG. 5. Substrate 70 is constructed so that it does not deform in either a convex or concave shape in relation to liquid crystal layer 6 as temperature changes. This is accomplished by making plastic films 22″ and 23″ of materials having substantially the same temperature expansion coefficient. For example, one can use either the same or different kinds of plastic films. For example, cellulose, polysulfone acryl, phenoxy and polyester resins may be used. It is preferable, however, that plastic films 22″ and 23″ be of the same material.

After the liquid crystal display element has been constructed in this manner, upper electrode substrate 1 tends to curve outward in a concave shape since the thermal expansion coefficient of film 13 is less than the thermal expansion coefficient of film 12 on the opposite side of liquid crystal layer 6. Lower electrode substrate 70 does not deform, and the two substrates 1 and 70 compress spacers 5. Since spacers 5 are rigid electrode substrates 1 and 70 cannot reduce the space between the substrates to less than the thickness of spacers 5, thereby making the cell thickness entirely uniform across the entire surface area.

Figure 7:
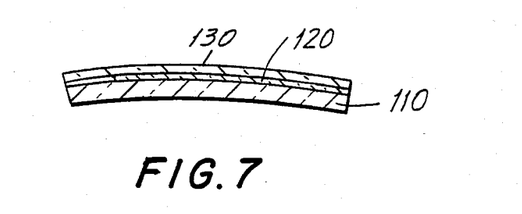
FIG. 7 is a cross-sectional view of a flexible substrate in accordance with the invention.
Figure 8:
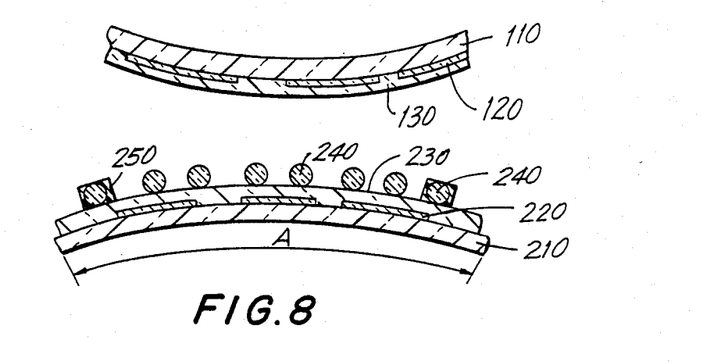
FIG. 8 is a cross-sectional view of a liquid crystal display panel being assembled in accordance with this invention.
Figure 9:
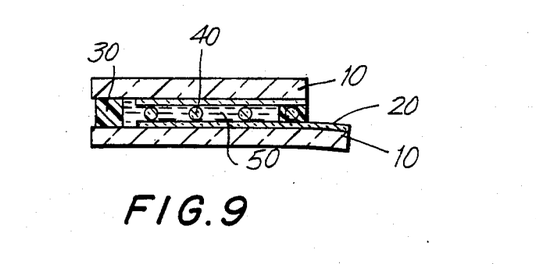
FIG. 9 is a cross-sectional view of a liquid crystal display panel produced by the process in accordance with the invention.

Reference is next made to FIGS. 7, 8, and 9, wherein the process for producing a liquid crystal display panel using flexible substrates in accordance with the invention is shown. The process creates a liquid crystal display panel of uniform thickness using at least one flexible substrate having a curvature. Examples of the curved substrates include those described in connection with embodiments of Types A–D. Reference is made to FIG. 7 wherein a substrate 110 of flexible material having a curvature depicted. This flexible material may be any flexible plastic resin, plastic film, laminated plastic film or metal thin plate. Examples of the plastic materials include, polyester resins, cellulose resins, polyethersulfone resins, polysulfone resins and acrylic resins. Plastic films obtained by making the above resins into films, and plastic film obtained by laminating the above resins and films may also be used. In addition, polarizing plates constructed by laminating and integrating the aforenoted films with a PVA film incorporating a dichromatic paint and having polarizing properties or with PVA film plus a cellulose acetate film, laminates formed from a polarizing plate of K film, and a polarizing plate itself composed of the above polarizing plate may be used as the plastic substrates. It is also possible to laminate an aluminum foil or an aluminum thin plate on one side, or to deposit or spatter aluminum or silver onto the surface of a plastic film. The thickness of such substrates is between about 0.025–1.5 mm. If the liquid crystal display panel is to be made thinner, a thickness of about 0.025–1 mm is preferred. Further a liquid crystal display panel of a thickness of about 0.05–0.2 mm may be readily produced.

A transparent conductive film 120 of $SnO_2$, $In_2O_3$ or a mixture of $SnO_2$ and $In_2O_3$, hereinafter referred to as ITO is formed, for example, by spattering or depositing on substrate 110. ITO is used as a mixing ratio of $SnO_2$ to $In_2O_3$ in the range of 0.05–200. The thickness of transparent conductive film 120 is about 100–700 Å. A predetermined pattern is formed by an etching technique such as chemical etching, ion beam etching or plasma etching. An orientation film 130 is formed on the surface of transparent conductive film 120. Orientation film 130 is an orientation film made of a polyimide resin, a polyamide resin, a polyimideamide resin having a thickness of 5–700 Å and is orientation treated by rubbing. Alternatively, the orientation treatment may be conducted by oblique deposition of for example $SiO_2$. A curve is imparted to substrate 110 so that one surface is convex and the other is concave. A pair of substrates having this curvature are assembled so that the convex surfaces face each other as shown in FIG. 8.

In FIG. 8, upper substrate 110 is arranged with the convex surfaces facing a lower substrate 210 having transparent electrodes 220 and orientation treated films 230 disposed thereon. Substrate 210 is sprayed with a gap or spacing agent 240, such as glass fiber or glass beads. A sealing agent 250, such as an epoxy, silicone, polyester resin, or adhesive is printed about the periphery of substrate 210. Sealing agent 250 may also contain gap agent 240 dispersed thereon. Sealing agent 250 and gap agent 240 may be disposed on the same or opposite substrates. Further, substrates 110 and 210 may be sprayed with the gap agent 240 and at the same time printed with the sealing agent 250.

The radius of curvature of substrates 110 and 210 is preferably between about 5 to 100 times the length (A) of the display panel along the curvature direction. Length (A) means the length of the substrate along the curvature. The substrate is formed to the correct length by assembling and cutting off the excess length of substrates 110 and 210.

In order to impart curvature to substrates 110 and 210, various methods in addition to those described for the embodiments of Types A–D are available. For example, curvature may be imparted by passing the substrate through a roll-shaped heat treatment step just before assembling, using a rolled material, heat treating in the rolled condition or by leaving the product in a roll-shape for several weeks. In addition, curvature may be imparted to the substrate before or after adding the transparent conductive film, after conducting orientation treatment on the substrate surface, after applying the sealing agent and/or gap agent onto the substrate surface or at any other convenient time.

EXAMPLE 1

A polyester film (polyethersulfone film) of 100μ thickness was imparted with curvature having a 30 cm. radius by heat treatment while rolled. A transparent conductive film of a mixture of titanium oxide-indium oxide was deposited on the film surface by ion spattering. Thereafter, a predetermined electrode pattern was formed by photolithography. A polyimide resin was coated across the surface to a thickness of 500 Å as an orientation film. Orientation treatment was conducted by rubbing with gauze in one direction. A sealing agent composed of an epoxy adhesive was printed by screen printing and glass fiber fine pieces of 10±0.1μ in thickness was sprayed onto the substrate as a gap agent. The two prepared substrates were assembled and cured. A liquid crystal composition was introduced into the cell by vacuum injection and the opening was sealed with an epoxy adhesive to prepare a liquid crystal cell of 3×3 centimeters on the outside.

The thickness of this liquid crystal layer of this liquid crystal display panel was almost uniformly of 10–11μ, and showed better operating results than display panels assembled from flat films with a liquid crystal layer thickness fluctuating between 10 and 15μ.

EXAMPLE 2

A cellulose acetate film of 50μ in thickness was given a 50 cm radius curvature by heat treatment while rolled. An indium oxide film was deposited on the film surface by deposition. The procedures of Example 1 were performed to provide a liquid crystal cell of 3×3 cm on the outside.

The thickness of the liquid crystal cell was uniformly between 10–11μ.

EXAMPLE 3

A polyethersulfone film 200μ thick was given a 40 cm radius curvature and a transparent conductive film deposited thereon in the same manner as the film in Example 1. The procedures of Example 1 were followed to assemble the liquid crystal cell. In this example, the sealing agent used was a silicone adhesive. The thickness of the resulting liquid crystal cell was uniformly between 10 and 11μ.

EXAMPLE 4

The procedures of Example 1 were followed using a polysulfone film of 300μ in thickness to construct a liquid crystal cell. The thickness of the resulting liquid crystal cell was uniformly between 10 and 11μ.

EXAMPLE 5

A liquid crystal cell was assembled according to the procedures of Example 1 except that the transparent conductive film was a titanium oxide-indium oxide mixed system formed by deposition. Results similar to those in Example 1 were obtained.

EXAMPLE 6

A liquid crystal cell was assembled according to the procedures of Example 1 except that the orientation treatment was performed by depositing $SnO_2$. Results similar to those in Example 1 were obtained.

EXAMPLE 7

The procedures of Examples 1–6 were followed with curvature imparted to the films by leaving the film in a rolled condition for about a month. The resulting liquid crystal cells showed results similar to those in Examples 1–6.

Example 8

Curvature was imparted to a film by passing the film through a roll-shaped heating device after the depositing of the transparent conductive film on the film surface. The steps of orientation treatment, printing of the sealing agent and spraying of the gap agent, assembling and injection of the liquid crystal were performed as in Examples 1–6. The resulting liquid crystal cells exhibited results similar to those in Examples 1–6.

EXAMPLE 9

A transparent conductive film was formed on a film surface, an orientation treatment was performed, and then curvature was imparted by passing through a roll-shaped heating member. Thereafter, steps for printing of the sealing agent and spraying of the gap agent, assembling and injection of liquid crystal were performed as in Examples 1–6. The resulting liquid crystal cells showed results similar to those in Examples 1–6.

EXAMPLE 10

A transparent conductive film was formed on a film surface, an orientation treatment was performed for each variation in Examples 1–6, a sealing agent was printed and a gap agent was sprayed. Curvature was imparted by passing the substrates through a roll-shaped heating member as in Example 9. The cells were assembled and injected with a liquid crystal material. The resulting liquid crystal cells exhibited results similar to those in Examples 1–6.

EXAMPLE 11

Liquid crystal display cells were assembled as in Examples 1–10 using a silicone sealing material. The cells were were injected with a liquid crystal material under uniform pressured conditions and sealed with a silicone rubber. The thickness of the liquid crystal layer in each case was about $10\pm0.3\mu$.

The liquid crystal display panel and process for production in accordance with the invention provide several benefits. Since the polarizing film is laminated between two plastic films, it does not easily deteriorate due to temperature or humidity. At the same time, the cell thickness is uniform. As a result of this, the reliability of the liquid crystal display panels constructed using the plastic electrode bases is increased. Additionally, uniformity of response speed and prevention of Newton ring formation are achieved due to the uniformity of cell thickness. Since the distance between the polarizing film and the liquid crystal layer is short, the optical angle range is widened. Further, since the total thickness of the liquid crystal display panel is small, electronic equipment incorporating the liquid crystal display panel can be made very thin.

The following additional benefits are obtained by constructing a liquid crystal display panel by the process of the invention.

1. Since flexible plastic materials are used as substrate materials, the step of imparting curvature to the substrate material is performed before assembling the two substrates. Assembly is conducted in such a way that the convex surfaces face the liquid crystal layer and also face each other. The use of a gap agent makes it possible to construct a liquid crystal display panel having a uniform cell thickness. Color shading and difference in the response speed depending on the position in the cell are avoided and the contrast is uniform.

2. The use of flexible plastic materials provides flexibility so that the sealed elements between the two substrates do not peel off and the substrates do not break. For example, if a glass plate with curvature but no flexibility and much rigidity is used as a substrate, the restoring force is strong and the sealed part tends to peel off. Additionally, the substrate tends to break even with a small external force. In contrast a liquid crystal display panel constructed in accordance with the process of this invention is free from such disadvantages.

3. The use of plastic materials for forming the substrates permit imparting of curvature prior to assembly. Additionally, the plastic materials are flexible and generally easily worked, as compared with trying to curve such rigid materials as glass plates. Thus, the step of imparting curvature is easy and accurate.

It will thus be seen that the objects set forth above, among those made apparent from the preceding description, are efficiently attained and, since certain changes may be made in carrying out the above process and in the constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A liquid crystal display panel having uniform cell thickness, comprising:
   a first substrate and a second opposed substrate, each said substrate having cooperating electrode means selectively disposed on the interior surfaces thereof,
   at least one of the substrates being a laminate of two flexible plastic films and a polarizing film therebetween, the two plastic films having different thermal expansion coefficients, the thermal expansion coefficient of the film on the interior surface being less than the thermal expansion coefficient on the opposed surface so that the center of the substrate is biased convexly towards the opposed substrate,
   substantially rigid spacer means disposed between said substrates; and
   adhesive means disposed about the periphery of the substrates for coupling the substrates and maintaining the display panel assembled, said at least one substrate being a laminate biased against the spacer means for maintaining uniform thickness across the display panel.

2. The liquid crystal display panel of claim 1, wherein each of the substrates is a laminate of two plastic films and a polarizing film therebetween, the two plastic films having different thermal expansion coefficients, the thermal expansion coefficient of the film on the interior surface being less than the thermal expansion coefficient on the opposed surface so that the center of each substrate is biased against the spacer means.

3. The liquid crystal display panel of claim 2, wherein one of the substrates includes a reflective layer laminated between the polarizing film and the plastic film on the outer surface thereof.

4. The liquid crystal display panel of claim 1, wherein the first substrate is a laminate of two plastic films and a polarizing film therebetween, with the plastic films having different thermal expansion coefficients, the thermal expansion coefficient of the film on the interior surface being less than the thermal expansion coefficient on the opposed surface and the second substrate is a laminate of two plastic films and a polarizing film therebetween the two plastic films having the same thermal expansion coefficient which is less than the thermal expansion coefficient of the plastic film in the interior surface of the first substrate.

5. The liquid crystal display panel of claim 4, wherein the second substrate further includes a reflective layer laminated between the polarizing film and the plastic film on the exterior surface thereof.

6. The liquid crystal display panel of claim 1, wherein the first substrate is a laminate of two plastic films and a polarizing film therebetween with the plastic films having different thermal expansion coefficients, the thermal expansion coefficient of the film on the interior surface being less than the thermal expansion coefficient on the opposed surface and the second substrate is a laminate of two plastic films and a polarizing film therebetween with the plastic films having the same thermal expansion coefficient which is the same as the thermal expansion coefficient of the plastic film in the interior surface of the first substrate.

7. The liquid crystal display panel of claim 6, wherein the second substrate includes a reflective layer laminated between the polarizing film and the plastic film on the outer surface thereof.

8. The liquid crystal display panel of claim 1, wherein the first substrate is a laminate of two plastic films and a polarizing film therebeween with the two plastic films having different expansion coefficients, the thermal expansion coefficient of the plastic film on the interior surface being less than the thermal expansion coefficient of the plastic film on the opposed surface and the second substrate is a laminate of two plastic films and a polarizing film therebetween with the plastic films having different thermal expansion coefficients which are less than the thermal expansion coefficient of the plastic film on the interior surface of the first substrate.

9. The liquid crystal display panel of claim 8, wherein the second substrates includes a reflective layer laminated between the polarizing film and the plastic film on the outer surface thereof.

10. The liquid crystal display panel of claim 1, further including a liquid crystal material between the substrates.

11. The liquid crystal display panel of claim 1, wherein the plastic film are of a plastic material selected from the group consisting of polyester resin, cellulosic resin, polysulfone resin, polyethersulfone resin, polycarbonate resin, acrylic resin and laminates thereof.

12. A liquid crystal display panel having uniform cell thickness, comprising:
   a first substrate and a second opposed substrate, each said substrate having cooperating electrode means selectively disposed on the interior surfaces thereof,
   each substrate being a laminate of two flexible plastic films and a polarizing film therebetween, the two plastic films having different thermal expansion coefficients, the thermal expansion coefficient of the film on the interior surface being less than the thermal expansion coefficient of the film on the opposed surface so that the center of the substrate is biased convexly towards the opposed substrate,
   substantially rigid spacer means disposed in the space between said substrates; and
   adhesive means disposed about the periphery of the substrates for coupling the substrates and maintaining the display panel assembled, said substrates being laminates biased against the spacer means for maintaining uniform thickness across the display panel.

13. The liquid crystal display panel of claim 12, wherein one of the substrates includes a reflective layer laminated between the polarizing film and the plastic film on the outer surface thereof.

14. A liquid crystal display panel having uniform cell thickness, comprising:
   a first substrate and a second opposed substrate, each said substrate having cooperating electrode means selectively disposed on the interior surfaces thereof,
   at least one of the substrates being a laminate of two flexible plastic films and a polarizing film therebetween, the two plastic films having different thermal expansion coefficients the thermal expansion coefficient of the film on the interior surface being less than the thermal expansion coefficient of the film on the opposed surface so that the center of the substrate is biased convexly towards the opposed substrate;
   the second substrate is a laminate of two plastic films and a polarizing film therebetween, the plastic films having the same thermal expansion coefficient which is equal to the thermal expansion coefficient of the plastic film in the interior surface of the first substrate;
   substantially rigid spacer means disposed between said substrates; and
   adhesive means disposed about the periphery of the substrates for coupling the substrates and maintaining the display panel assembled, said at least one substrate being a laminate biased against the spacer means for maintaining uniform thickness across the display panel.

15. The liquid crystal display panel of claim 14, wherein the second substrate includes a reflective layer laminated between the polarizing film and the plastic film on the outer surface thereof.

16. A liquid crystal display panel having uniform cell thickness, comprising:
   a first substrate and a second opposed substrate, each said substrate having cooperating electrode means selectively disposed on the interior surfaces thereof,
   at least one of the substrates being a laminate of two flexible plastic films and a polarizing film therebetween, the two plastic films having different thermal expansion coefficients the thermal expansion coefficient of the film on the interior surface being less than the thermal expansion coefficient of the film on the opposed surface so that the center of the substrate is biased convexly towards the opposed substrate;
   the second substrate is a laminate of two plastic films and a polarizing film therebetween, the plastic films having the same thermal expansion coefficient which is less than the thermal expansion coefficient of the plastic film in the interior surface of the first substrate;
   substantially rigid spacer means disposed between said substrates; and
   adhesive means disposed about the periphery of the substrates for coupling the substrates and maintaining the display panel assembled, ssid at least one substrate being a laminate biased against the spacer means for maintaining uniform thickness across the display panel.

17. The liquid crystal display panel of claim 16, wherein the second substrate includes a reflective layer laminated between the polarizing film and the plastic film on the outer surface thereof.

18. A flexible substrate for a liquid crystal display device, comprising a laminate of a first flexible plastic film, a polarizing film and a second flexible plastic film, the polarizing film laminated between the plastic films, each of said plastic films having different thermal expansion coefficients so that curvature is imparted to the substrate.

19. The substrate of claim 18, further including transparent electrode means disposed on the surface of the plastic film having the lower thermal expansion coefficient.

20. The substrate of claim 19, further including a reflective layer laminated between the polarizing film and the plastic film having the higher thermal expansion coefficient.

21. A process for assembling a liquid crystal display panel, comprising:
forming at least one flexible substrate by laminating a polarizing film between two plastic films, each of said plastic films having different thermal expansion coefficients;
imparting curvature to said at least one substrate;
forming transparent electrode means in a predetermined pattern on the convex surface of said at least one substrate and a cooperating substrate;
conducting orientation treatment on the convex surface of the at least one substrate and the cooperating substrate;
depositing a sealing agent and a gap material on one of the substrates;
joining the substrates with the surfaces bearing the electrode means facing each other;
injecting a liquid crystal material into the space between the substrates; and
sealing the display panel.

22. A process for assembling a liquid crystal display panel, comprising:
forming at least one flexible substrate by laminating a polarizing film between two plastic films, each of said plastic films having different thermal expansion coefficients;
forming transparent electrode means in a predetermined pattern on the convex surface of said at least one substrate and a cooperating substrate;
imparting curvature to said at least one substrate;
conducting orientation treatment on the convex surface of the at least one substrate and the cooperating substrate;
depositing a sealing agent and a gap material on one of the substrates;
joining the substrates with the surfaces bearing the electrode means facing each other;
injecting a liquid crystal material into the space between the substrates; and
sealing the display panel.

23. A process for assembling a liquid crystal display panel, comprising:
forming at least one flexible substrate by laminating a polarizing film between two plastic films, each of said plastic films having different thermal expansion coefficients;
forming transparent electrode means in a predetermined pattern on the convex surface of said at least one substrate and a cooperating substrate;
conducting orientation treatment on the convex surface of the at least one substrate and the cooperating substrate;
imparting curvature to said at least one substrate;
depositing a sealing agent and a gap material on one of the substrates;
joining the substrates with the surfaces bearing the electrode means facing each other;
injecting a liquid crystal material into the space between the substrates; and
sealing the display panel.

24. A process for assembling a liquid crystal display panel, comprising:
forming at least one flexible substrate by laminating a polarizing film between two plastic films, each of said plastic films having different thermal expansion coefficients;
forming transparent electrode means in a predetermined pattern on the convex surface of said at least one substrate and a cooperating substrate;
conducting orientation treatment on the convex surface of the at least one substrate and the cooperating substrate;
depositing a sealing agent and a gap material on one of the substrates;
imparting curvature to said at least one substrate;
joining the substrates with the surfaces bearing the electrode means facing each other;
injecting a liquid crystal material into the space between the substrates; and
sealing the display panel.

* * * * *